(No Model.)
2 Sheets—Sheet 2.
J. L. MADDEN.
HAY OR COTTON PRESS.
No. 351,610. Patented Oct. 26, 1886.
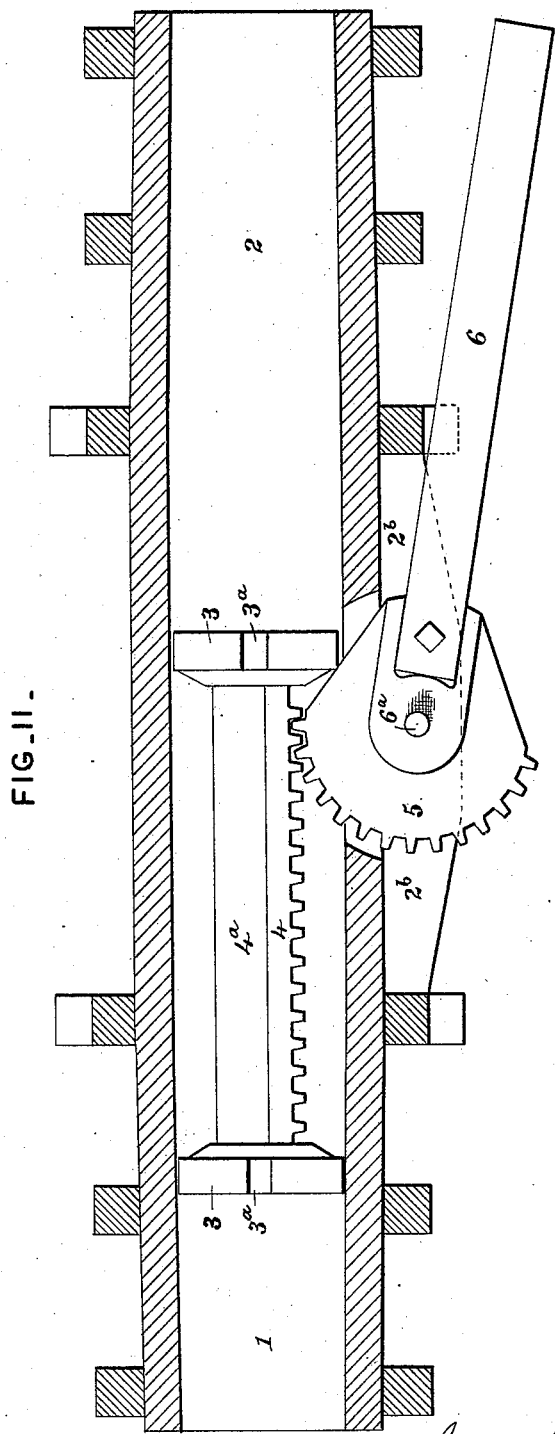
FIG. II.
Attest:
Geo. T. Smallwood.
Edward Stein.
Inventor
James L. Madden.
By Knight Bros.
Attys.

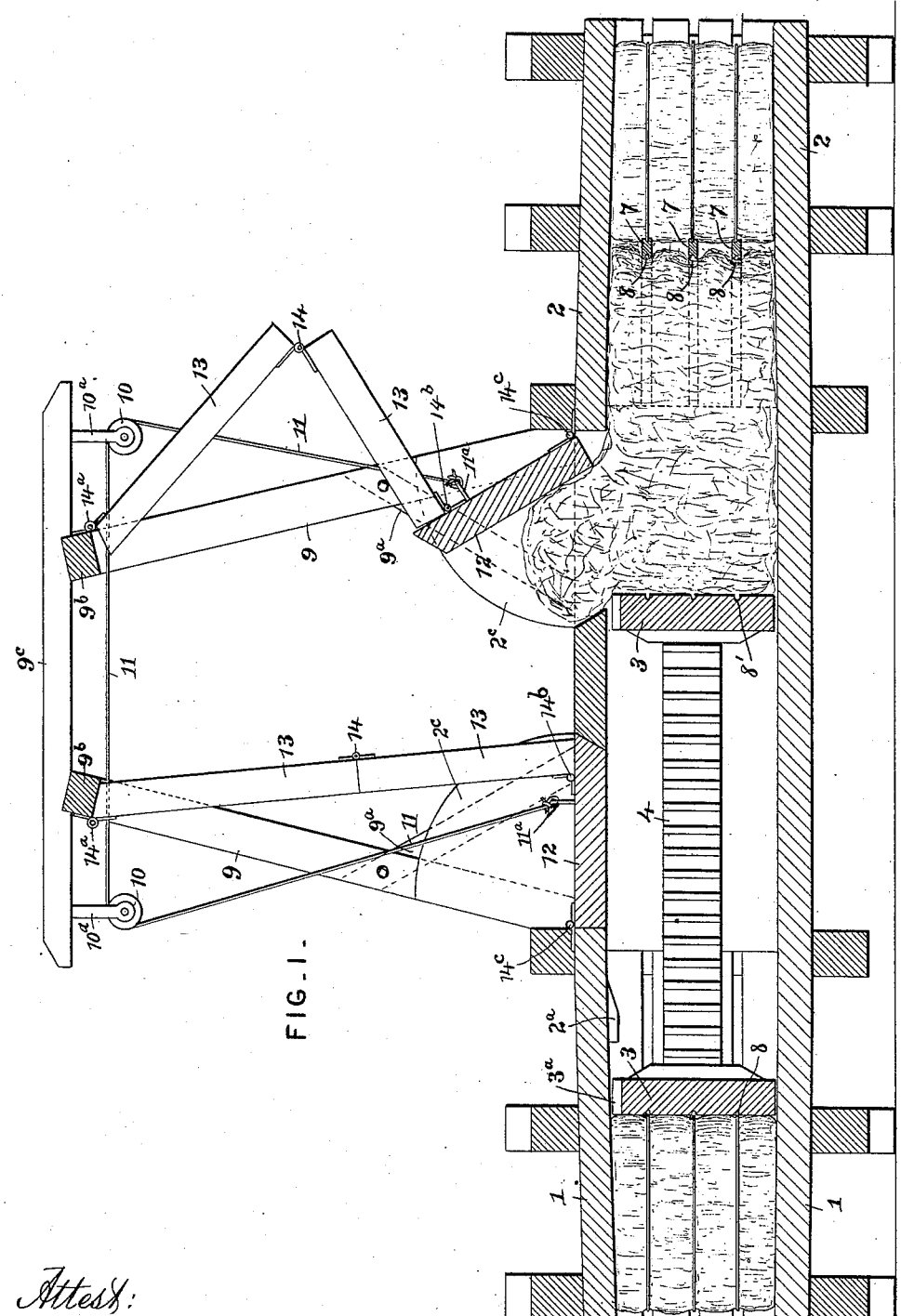

UNITED STATES PATENT OFFICE.

JAMES L. MADDEN, OF LEWISPORT, KENTUCKY.

HAY OR COTTON PRESS.

SPECIFICATION forming part of Letters Patent No. 351,610, dated October 26, 1886.

Application filed August 24, 1885. Serial No. 175,176. (No model.)

*To all whom it may concern:*

Be it known that I, JAMES L. MADDEN, a citizen of the United States, residing at Lewisport, in the county of Hancock and State of Kentucky, have invented certain new and useful Improvements in Hay or Cotton Presses, of which the following is a specification.

In order that my invention may be fully understood, I will proceed to describe it with reference to the accompanying drawings, in which—

Figure I is a vertical longitudinal section of my improved press. Fig. II represents in plan the follower-operating mechanism.

1 2 are the press-boxes, preferably made solid at top and bottom and slatted at sides. 3 3 are the press-blocks or followers, rigidly connected by bars $4^a$ and rack-bar 4. The blocks or followers are guided by cleats $2^a$, which enter their recesses $3^a$. 5 is a segment rack-block engaging with said rack-bar, pivoted at $6^a$ in the supporting-blocks $2^b$ of the press-frame, and having horizontal arm or lever 6, by means of which its racks and the follower-blocks are operated. Preferably, as here shown, the press-boxes taper slightly at their outer ends.

7 7 are a series of cross-bars, preferably of wood, grooved, as shown at 8, and lying between the slats of the sides of the press box parallel with and opposite to the grooves $8'$ in the follower-blocks.

A frame consisting of stanchions 9, stays $9^a$, cross-beams $9^b$, and longitudinal beam $9^c$ is supported over the center of the press, the hangers $10^a$ of the longitudinal beam carrying eyes or pulleys 10, through which runs a rope or chain, 11, having its ends fixed to the eye-bolt or rings $11^a$ on the doors 12, hinged at $14^c$ in the top of the press, one at each side of the center.

13 are arms, having toggle-joint 14, and hinged at $14^a$ $14^c$ to the top and bottom of the frame 9 and doors 12, respectively. The pieces $2^c$ form chutes into the press.

The rope or chain 11 is, as shown, of such length as to allow either, but not both, of the doors 12 to close at one time.

The following is the operation of the press: The door 12 over press-box 1 being open, and the outer end of the said press-box being temporarily closed, hay or cotton is packed in through the door. The door is then closed, the other door 12 being for that purpose unlocked by striking the arm of the latter. By the lever 6 the follower 3 in box 1 is forced outward, compressing the hay or cotton therein. When the same is sufficiently compressed, and while the other box, 2, is being filled through its open door 12, the bale in box 1 is tied by wires or bands passed between the slats in the side of the box and through the grooves in the faces of the follower and head-block. The lever 6 is then forced in the opposite direction, compressing the hay or cotton in box 2 and opening a space in box 1 for a new charge. Before recharging box 1, however, the bars 7 are placed between the slats of the sides of the box, having their grooves 8 turned toward the follower and resting outwardly against the bale already tied. The head-block is removed from the end of the press-box, and by a reverse motion of the lever 6 the new charge of hay or cotton is compressed between the follower and the already-formed bale and tied. Then the continued movement of lever 6 discharges the first bale and forces the second one into its place. The two ends of the press are thus operated continuously at the same time, one bale being tied while the other end of the press is being charged, and no stoppage being made for the removal of a bale.

Having thus described my invention, the following is what I claim as new therein and desire to secure by Letters Patent:

1. The combination of two horizontal press-boxes having openings at the top provided with doors and a frame over said doors, and toggle-bars between the doors and the top of the frame, substantially as set forth.

2. The combination of two horizontal press-boxes having openings at the top provided with doors, a frame over said doors, toggle-bars between the doors and the top of the frame, hangers depending from the top of the frame, and a rope or chain extending through the hangers and connecting the doors, substantially as set forth.

3. The combination, with press-boxes having openings at the top provided with doors, a frame consisting of stanchions 9, cross-beams $9^b$, longitudinal beam $9^c$, and stays $9^a$, and the toggle-bars 13, substantially as set forth.

4. In combination with two doors for press-boxes and a rope or chain connecting same and supported as described, toggle-locking arms also connected to said doors, and arranged to operate substantially as set forth.

5. A cotton or hay press consisting of two horizontal press-boxes having openings at top provided with doors, a frame over the doors, toggle-arms connecting the doors and frame, a rack having followers, pivoted segment rack-block, and a handle secured to the block, substantially as set forth.

J. L. MADDEN.

Witnesses:
JOHN O. MADDEN,
I. B. HAYDEN.